(12) United States Patent
Larson et al.

(10) Patent No.: US 8,598,245 B2
(45) Date of Patent: Dec. 3, 2013

(54) INSULATING MATERIALS COMPRISING POLYSILAZANE, METHODS OF FORMING SUCH INSULATING MATERIALS, AND PRECURSOR FORMULATIONS COMPRISING POLYSILAZANE

(75) Inventors: Robert S. Larson, North Ogden, UT (US); Michael E. Fuller, Ogden, UT (US)

(73) Assignee: Alliant Techsystems Inc., Arlington, VA (US)

( * ) Notice: Subject to any disclaimer, the term of this patent is extended or adjusted under 35 U.S.C. 154(b) by 194 days.

(21) Appl. No.: 13/087,224

(22) Filed: Apr. 14, 2011

(65) Prior Publication Data

US 2012/0264838 A1   Oct. 18, 2012

(51) Int. Cl.
| | |
|---|---|
| *C08J 9/02* | (2006.01) |
| *C08J 9/00* | (2006.01) |
| *C08G 18/06* | (2006.01) |
| *C04B 38/02* | (2006.01) |

(52) U.S. Cl.
USPC .............. 521/86; 521/94; 521/122; 521/117; 521/155; 521/154; 521/128; 521/124; 525/474; 525/476; 501/84; 501/97.1

(58) Field of Classification Search
USPC ........... 521/154, 155, 122, 128, 117, 124, 86, 521/94; 525/474, 476; 501/84, 97.1
See application file for complete search history.

(56) References Cited

U.S. PATENT DOCUMENTS

| | | | |
|---|---|---|---|
| 3,239,489 A * | 3/1966 | Fink | 528/67 |
| 6,407,339 B1 | 6/2002 | Rice et al. | |
| 6,534,184 B2 | 3/2003 | Knasiak et al. | |
| 6,756,469 B2 | 6/2004 | Lukacs, III | |
| 7,368,150 B2 | 5/2008 | Pritchett | |
| 7,628,878 B2 | 12/2009 | Riedell et al. | |
| 2007/0199709 A1 | 8/2007 | Hooker et al. | |
| 2010/0194179 A1 | 8/2010 | Waltz | |

FOREIGN PATENT DOCUMENTS

EP     0825231 B1     12/2000

OTHER PUBLICATIONS

Colombo et al., "Ceramic Foams from a Preceramic Polymer and Polyurethanes: Preparation and Morphological Investigations," from the Journal of Sol-Gel Science and Technology, 13, pp. 195-199 (1998).*
Hellman et al. "Ceramic foams from Preceramic polymers," from Materials Research Innovations, (2002), vol. 6, pp. 260-262.*
Acrylic Hybrid 1055 Ready-to-use Protective Spray Coat, Product Code 226647, Product and Test Information, Clariant Corporation, 2008, 2 pages.
Ceraset® Polysilazane 20, Heat Curable Ceramic Precursor, Product Code 226645, Clariant Corporation, 2008, 2 pages.
Kion Defense: Products, Foams, Kion Defense Technologies, Dec. 9, 2010, http://kiondefense.com/products/foams.html, 1 page.
Urethane Hybrid 1058, Ready-to-use Protective Spray Coat, Clariant Corporation, 2008, 2 pages.

* cited by examiner

*Primary Examiner* — Randy Gulakowski
*Assistant Examiner* — Kara Boyle
(74) *Attorney, Agent, or Firm* — TraskBritt (57) ABSTRACT

Methods of forming an insulating material comprising combining a polysilazane, a cross-linking compound, and a gas-generating compound to form a reaction mixture, and curing the reaction mixture to form a modified polysilazane. The gas-generating compound may be water, an alcohol, an amine, or combinations thereof. The cross-linking compound may be an isocyanate, an epoxy resin, or combinations thereof. The insulating material may include a matrix comprising one of a reaction product of a polysilazane and an isocyanate and a reaction product of a polysilazane and an epoxy resin. The matrix also comprises a plurality of interconnected pores produced from one of reaction of the polysilazane and the isocyanate and from reaction of the polysilazane and the epoxy resin. A precursor formulation that comprises a polysilazane, a cross-linking compound, and a gas-generating compound is also disclosed.

16 Claims, 4 Drawing Sheets

INSULATING MATERIALS COMPRISING POLYSILAZANE, METHODS OF FORMING SUCH INSULATING MATERIALS, AND PRECURSOR FORMULATIONS COMPRISING POLYSILAZANE

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. NNMO7AA75C, awarded by NASA.

TECHNICAL FIELD

Embodiments of the present disclosure relate to insulating materials and methods of forming insulating materials and, more specifically, to insulating materials including a modified polysilazane and methods of forming such materials.

BACKGROUND

Takeoff and reentry of space vehicles creates a hostile environment characterized by high temperatures and turbulence. To protect a space vehicle, heat-sensitive components of the vehicle may be insulated. Without insulation, heat generated by friction as the space vehicle travels at high speed through the atmosphere may damage instruments or structures critical to performance of the space vehicle. A need to protect life and property dictates that sufficient insulation be applied to appropriate portions of space vehicles, to allow the space vehicles to safely launch and return to Earth.

Insulation may be damaged during ground operations, takeoff from Earth, or during flight operations. For instance, a piece of foam insulation broke off the external tank of the Space Shuttle Columbia during takeoff in 2003. The foam insulation piece struck a wing of the space vehicle and damaged the space vehicle's thermal protection system (another form of insulation). It is believed that the damage to the thermal protection system resulted in the disintegration of the Columbia upon reentry and the death of all the astronauts on board. Insulation may also be damaged during preparation for launch, such that repairs must be made in situ (e.g., on the launch pad).

Insulation materials may be selected based upon density, ability to withstand thermal loads, mechanical properties, application methods, toxicity of raw materials, or other properties. For example, an insulation material used to repair damaged insulation of a space vehicle may be selected based on low density, high thermal resistivity, and ability to be formed in situ. For various applications, different properties may be of differing importance. That is, an insulation material deemed appropriate or ideal for one application may be deemed less appropriate or inappropriate for another application.

Ceramics may be used as insulation materials. For example, ceramic tiles having insulating properties may be produced by forming a slurry of ceramic precursors and solids, such as fibers. The slurry may be formed into a mold and placed in an environment of heat and/or vacuum to form a solid ceramic material. Ceramic coatings may also be formed directly on articles requiring insulation. For example, polysilazane resins, such as those sold by Kion Specialty Polymers, of Charlotte, N.C., or Kion Defense Technologies, Inc., of Huntingdon Valley, Pa. (hereinafter, collectively "Kion"), under the trade names HTT 1800 and CERASET® Polysilazane 20, may be combined with a free-radical initiator and applied to surfaces by dipping the surfaces into the resin, or by spraying or brushing resin onto the surfaces. The ceramic coatings may be cured by heating them with or without vacuum, and the required cure time may vary based on the identity and concentration of the initiator and on the cure environment.

Foams, such as polyurethane foams, may be used as insulation materials. Polyurethane foams may be formed by mixing a polyol-based resin with an isocyanate. The components may be mixed as they are sprayed into place, forming the foam. Foams used as insulation may be formed in various shapes, such as in a mold or directly on components to be insulated. Reaction time required for the components to cure may vary based on the selection of the components and the conditions (e.g., temperature) of the mixture.

Fillers may be added during the formation of foams to change properties of the cured foam, such as density, thermal resistivity, modulus of elasticity, etc. Fillers may include particles or microballons of glass, carbon, or ceramic.

Foams may also be formed from polysilazane precursors. For example, polysilazane resins HTT 1800 and CERASET® Polysilazane 20 (Kion) may be mixed with hollow particles to form syntactic foams (foams in which the cells are formed of solid-phase materials, such as microspheres or microballoons). These foams may be molded under vacuum, and may be molded or machined to a desired a shape.

BRIEF SUMMARY

Some embodiments of the present disclosure include a method of forming an insulating material. The method comprises combining a polysilazane, a cross-linking compound, and a gas-generating compound to form a reaction mixture and curing the reaction mixture to form a modified polysilazane. The gas-generating compound is water, an alcohol, an amine, or a combination thereof. The cross-linking compound is an isocyanate, an epoxy resin, or a combination thereof.

Some embodiments of the present disclosure include an insulating material having a matrix comprising one of a reaction product of a polysilazane and an isocyanate and a reaction product of a polysilazane and an epoxy resin. The matrix also comprises a plurality of interconnected pores formed by gaseous products produced by reaction of one of the polysilazane and the isocyanate and by reaction of the polysilazane and the epoxy resin.

Other embodiments include a precursor formulation comprising a polysilazane, a cross-linking compound, and a gas-generating compound. The cross-linking compound may be an isocyanate, an epoxy resin, or a combination thereof. The gas-generating compound may be water, an alcohol, an amine, or a combination thereof.

BRIEF DESCRIPTION OF THE DRAWINGS

While the specification concludes with claims particularly pointing out and distinctly claiming that which is regarded as the invention, advantages of this invention may be more readily ascertained from the following detailed description when read in conjunction with the accompanying drawings in which:

DETAILED DESCRIPTION

Precursor formulations for an insulating material, insulating materials, and methods of forming insulating materials are described. The precursor formulation includes, before curing, a polysilazane, a cross-linking compound, and a gas-generating compound. The cross-linking compound may be an isocyanate compound, an epoxy resin, or combinations thereof. The gas-generating compound may be water, an alcohol, an amine, or combinations thereof. The precursor formulation may be formed by combining the polysilazane with the cross-linking compound and the gas-generating compound. The precursor formulation may be cured to form the insulating material. The precursor formulation may be foamed in situ on articles to be insulated, or may be foamed and cured prior to secondary bonding to articles to be insulated. The insulating material formed from the precursor formulation may have an increased reentry thermal load compared to an insulating material formed from FROTH-PAK™ polyurethane foam (available from Dow Chemical Co., Midland, Mich.).

As used herein, the term "foam" means and includes a material having an array of cells (bubbles, voids, or pores) formed therein. The cells may contain gases or solids. Foams may be formed by, for example, reacting a polymer with a curative, wherein the reaction generates a gas. The gas generated may form the cells of the foam, which become encapsulated or confined as the polymer cures. The cells may be closed or open, and the foams may include closed cells, open cells, or a combination of closed and open cells. In closed cells, pore spaces are not interconnected, whereas in open cells, the pore spaces are interconnected. Properties of the foam (e.g., density, thermal resistivity, etc.) may vary according to the size and quantity of the cells, according to whether the cells are hollow, and according to the properties of the material in which the cells are formed. In some foams, microspheres or other particles form the array of cells. The particles may or may not be hollow. Such foams may be formed, for example, by mixing microballoons (hollow microspheres) with a polymer, and subsequently curing the polymer. Foams may also be formed by combining microspheres or other particles with a mixture (e.g., a polymer and a curative), which reacts to generate a gas. These foams may have cells formed by gas bubbles and cells formed by particles.

As used herein, the term "polysilazane" means and includes a polymer or oligomer containing silicon atoms and nitrogen atoms bonded in an alternating sequence. Hydrogen atoms may also be present in the polysilazane. Polysilazanes have reactive Si—N functionality, enabling co-reaction with various electrophilic organic materials. The term "polysilazane" is not restricted to compounds containing only silicon, nitrogen, and hydrogen atoms, but may also include any polymeric or oligomeric compound having alternating silicon and nitrogen atoms, regardless of other functional groups that may be present. For example, the polysilazane may include carbon atoms. The carbon atoms may be present in organic functional groups, such as a vinyl group or a methyl group. The polysilazane may also include nitrogen-modified silazane groups that form urea- or urethane-silazane groups. The polysilazane may also include atoms of preceramic chemical groups, such as atoms of boron, zirconium, aluminum, titanium, hafnium, tantalum, niobium, vanadium, magnesium, calcium, strontium, barium, or combinations thereof. The polysilazane may be a homopolymer or a copolymer with another polysilazane or a non-silazane. The polysilazane may include a material sold under the trade names CERASET® Polysilazane 20 and HTT 1800, by Kion. As used herein, the term "modified polysilazane materials" means and includes a cross-linked polysilazane material having chemical groups formed from reaction of one or more polysilazanes, such as a reaction between the polysilazane and cross-linking compound, or between the polysilazane and gas-generating compound. The modified polysilazane material includes polymer networks that may include ureasilazane groups, urethane-silazane groups, siloxane groups, polysilazane groups, urethane groups, urea groups, ether groups, or primary, secondary or tertiary amine groups.

As used herein, the term "isocyanate" means and includes an organic compound having at least one —N=C=O functional group (i.e., an "isocyanate group") or a mixture of two or more of such compounds. An isocyanate compound may include two or more isocyanate groups; isocyanate compounds with two isocyanate groups are referred to in the art as diisocyanates; isocyanate compounds having three isocyanate groups are referred to as triisocyanates; etc. Nonetheless, compounds with at least one isocyanate group are included in the definition of "isocyanate" used herein. The isocyanate compounds may be aromatic compounds or aliphatic compounds. For example, isocyanates include methylene diphenyl diisocyanate (MDI), polymeric MDI (pMDI), isophorone diisocyanate (IPDI), toluene diisocyanate (TDI), paraphenylene diisocyanate (PPDI), dimeryl diisocyanate (DDI), and hexamethylene diisocyanate (HDI). As used herein, the term "blocked isocyanate" means and includes an isocyanate compound that has been reacted with at least one blocking group (a group with steric hindrance, such as dimethyl pyrazole, methylethylketoxime, caprolactam, phenol, etc.) that retards or prevents reaction of the isocyanate group. When a blocked isocyanate is heated, the blocking group may be released from the isocyanate, allowing the isocyanate group to react.

As used herein, the term "epoxy resin" means and includes a monomer or a short chain polymer having two or more epoxide functional groups. For example, an epoxy resin may include compounds formed from a reaction between epichlorohydrin and bisphenol-A, and may have epoxide functional groups at both ends of each molecule.

Insulating materials according to embodiments of the present disclosure may be formed by combining and reacting the polysilazane, the cross-linking compound, and the gas-generating compound to form a reaction mixture. Multiple reactions may proceed simultaneously to cure the precursor formulation and form the insulating material. For example, the polysilazane may react with at least one of the cross-linking compound and the gas-generating compound, and the cross-linking compound and the gas-generating compound may react with each other. One or more of the reactions may produce gas, and the gas produced may form bubbles within the insulating material. As the insulating material cures, the bubbles may become confined within the insulating material.

Some embodiments of the present disclosure include forming an insulating material by combining a polysilazane, an isocyanate, and a gas-generating compound. That is, the cross-linking compound may be an isocyanate. The gas-generating compound may be water, an alcohol, an amine, or combinations thereof. For example, the gas-generating compound may include, a mono-alcohol (e.g., methanol, ethanol, 1-propanol, 2-propanol, etc.), a di-alcohol (e.g., ethylene glycol, propylene glycol, dipropylene glycol, etc.), or a polyalcohol (e.g., polyether- or polyester-based polyols, polyphenols, etc.). The gas-generating compound may also include a monoamine (e.g., ethylamine, propylamine, etc.) or a diamine (e.g., ethylenediamine, diethylenetriamine, etc.). The gas-generating compound may also be a polyether-based compound or aminoethane. The gas-generating compound may include combinations of one or more of the compounds described. This precursor formulation may be formed at the point of application (i.e., one or more of the components may be kept separate from other components until the insulating material is to be formed). Upon mixing, the gas-generating compound may react with the isocyanate and/or with the polysilazane to form a gas. The gas may form bubbles causing the reaction mixture to foam. As gas is generated, the reaction mixture may expand or swell. In some embodiments, the expanding reaction mixture may fill a template or mold. The expansion of the reaction mixture lowers its density. In some embodiments, the reaction mixture, after expansion, may have a density of less than or equal to about 1.0 g/cm$^3$ (62 lb/ft$^3$), less than or equal to about 0.5 g/cm$^3$ (31 lb/ft$^3$), less than or equal to about 0.16 g/cm$^3$ (10 lb/ft$^3$), or less than or equal to about 0.05 g/cm$^3$ (3.1 lb/ft$^3$).

The ability to use water, the alcohol, or the amine as a component of the reaction mixture was unexpected because water, the alcohol, or the amine is considered to be incompatible with conventional compositions that include polysilazanes. The use of water, the alcohol, or the amine in conventional compositions that contain polysilazanes was avoided because undesirable side reactions occurred, such as the production of ammonia. However, since the water, the alcohol, or the amine functions in the polysilazane-containing precursor formulation to produce a gas, such as ammonia, the water, the alcohol, or the amine may be a desirable component of the embodiments of the precursor formulations of the present disclosure.

As or after the reaction mixture is formed, the reaction mixture may begin to cure (i.e., components of the reaction mixture may react to form a solid matrix of the insulating material). The cure reaction may include polymer cross-linking via an isocyanate or epoxy cure reaction. The cure rate of the reaction mixture may vary based on the concentration of one or more components of the reaction mixture, temperature, pressure, atmospheric composition (e.g., percent relative humidity), presence of a catalyst, etc. The cured precursor formulation (i.e., the insulating material) may have a density of less than or equal to about 1.0 g/cm$^3$ (62 lb/ft$^3$), less than or equal to about 0.5 g/cm$^3$ (31 lb/ft$^3$), less than or equal to about 0.16 g/cm$^3$ (10 lb/ft$^3$), or less than or equal to about 0.05 g/cm$^3$ (3.1 lb/ft$^3$). The density may vary inversely with the volume of gas confined within the material. The reaction mixture may be cured at a temperature of less than about 200° C., such as less than about 100° C. In one embodiment, the cure temperature may be about room temperature (i.e., between about 20° C. and about 25° C.).

The gas-generating compound in the precursor formulation may generate at least one of ammonia and carbon dioxide. The gas-generating compound may react with the polysilazane or the isocyanate to produce the gas. The quantity and identity of gas generated may vary based on the quantity and identity of the components of the reaction mixture. For example, reaction of a polysilazane with water produces ammonia gas (NH$_3$) according to the following reaction:

(reaction 1)

The reaction of a polysilazane with an alcohol also produces ammonia gas according to the following reaction:

(reaction 2)

Reaction of polysilazane with an alcohol having only one alcohol (—OH) functional group utilizes two moles of alcohol per mole of polysilazane, versus a 1:1 molar ratio for the reaction of polysilazane with water shown in reaction 1 above. Furthermore, reaction with a monofunctional alcohol as shown in reaction 2 cleaves the polysilazane polymer (i.e., causes polymer scission). For this reason, monofunctional alcohols in the reaction mixture may decrease the degree of cross-linking in an insulating material formed from such a mixture.

Like water and alcohol, amines produce ammonia gas upon reaction with a polysilazane according to the following reaction:

(reaction 3)

Like reaction 1, the reaction of a monofunctional amine with the polysilazane in a 1:1 ratio produces an uncleaved polymer and ammonia gas. Amines with multiple amino groups (diamines, triamines, etc.) may react with multiple polysilazanes and may form cross-links between polysilazanes.

The gas-generating compound may also react with the isocyanate. For example, a reaction of water with an isocyanate produces an amine and carbon dioxide ($CO_2$) according to the following reaction:

(reaction 4)

The reaction of an amine (either added to the reaction mixture or as the product of reaction 4) with an isocyanate forms a urea compound (a compound having a carbonyl group attached to two organic amine residues), without generating a gas according to the following reaction:

(reaction 5)

Likewise, the reaction of an alcohol with an isocyanate forms a urethane compound without generating a gas, according to the following reaction:

(reaction 6)

Isocyanates and polysilazanes may also react with one another. An isocyanate compound with a single isocyanate functional group may react with a single polysilazane. Without being bound by a particular theory, it is believed that the reaction may proceed as follows:

(reaction 7)

Because reaction of polysilazane with isocyanates having single isocyanate functional groups produces no cross-linking, such isocyanates are not generally used alone for polymerization reactions, though they may be used in combination with multifunctional isocyanates to control the degree of cross-linking. Diisocyanates may be added to a reaction mixture to effect cross-linking according to the following reaction:

(reaction 8)

A diisocyanate molecule may react with two separate polysilazane molecules, producing a cross-linked material. This reaction may be referred to as an isocyanate cure reaction. In some embodiments, isocyanates with more than two isocyanate groups may be used. Use of isocyanates with more than two isocyanate groups may produce a material with a higher degree of cross-linking than a material formed from diisocyanates. Such isocyanates may be used in various ratios to vary or select the level of cross-linking (e.g., a diisocyanate and a triisocyanate may be used, and the ratio of diisocyanate to triisocyanate may be varied, with a higher proportion of triisocyanate corresponding to a higher degree of cross-linking).

When a polysilazane, an isocyanate, and a gas-generating compound are combined, two or more of the reactions 1 through 8 may occur simultaneously. For example, in a mixture of a polysilazane, a diisocyanate, and water, reactions 1, 3, 4, 5, and 8 may occur—some competing (i.e., consuming one or more common reactants) and some complementary (i.e., a product of one reaction may be a reactant of another). The use of water, alcohol, and amine has been avoided in conventional compositions including polysilazanes because they react with polysilazanes to form ammonia, which has been undesirable in conventional compositions.

In some embodiments, the reaction rates of the gas-generating reactions (reactions 1 through 4) may be sufficiently high that the gas generated in the reaction mixture may foam the material, forming bubbles that remain in the reaction mixture as the reaction mixture cures. Thus, insulating materials of the present disclosure may include foams formed without the addition of a blowing agent.

To modify the rate of one or more reactions and/or optimize properties of the reaction products, one or more catalysts may be added to the reaction mixture. For example, catalysts such as metal salts or organometallic complexes (e.g., dibutyl tin dilaurate (DBTDL) triphenyl bismuth, etc.), quaternary ammonium salts, alkali metal carboxylates, or tertiary or quaternary amines, may increase the cure rate of the reaction mixture. Various catalysts may be selected for their abilities to promote certain reactions, such as the reaction of isocyanate with water or alcohol. For example, N,N',N"-dimethylamino-propyl hexahydrotriazine (commercially available as POLY-CAT® 41, from Air Products and Chemicals, Inc., of Allentown, Pa.), a tertiary amine catalyst, may promote reactions 4 and 6, and may promote the formation of isocyanurates through isocyanate trimerization. This catalyst, therefore, may be used in various concentrations to vary the ratio and/or total quantity of $CO_2$ and $NH_3$ gas generated in the reaction mixture. It may also be used to vary the reaction rate of the isocyanate cure reaction (reaction 8).

Reaction rates may also vary based on the identity of the components of the reaction mixture. For example, aromatic isocyanates, such as MDI, may react more quickly with polysilazanes than aliphatic isocyanates, such as IPDI or DDI (reaction 8). Likewise, unhindered, primary alcohols and amines may react more quickly with polysilazanes than hindered, secondary alcohols and amines (reactions 5 and 6). Some reactions may also utilize heat input to proceed at any appreciable rate.

In some reaction mixtures, the reaction rate of the isocyanate cure reaction (reaction 8) may be much higher than the reaction rates of gas-generating reactions (reactions 1-4). Such a mixture may generate few gas bubbles, which become the foam cells as the reaction mixture cures. One or more catalysts (e.g., DBTDL) may be added to increase the reaction rate of the gas-generating reaction relative to the reaction rate of the isocyanate cure reaction. An increase in the reaction rate of the gas-generating reaction may increase the quantity of gas within the reaction mixture. This, in turn, may increase the number of cells formed in the foam. An increase in the number of cells in the foam may, for example, decrease the density of the foam or increase the foam's thermal resistivity.

A high reaction rate of the isocyanate cure reaction (reaction 8) may be beneficial for some applications because it may enable the polysilazane to cure quickly without added heat. This may be valuable for application or repair of insulating materials to parts that cannot easily be placed in a cure oven (e.g., large parts or parts sensitive to heat, such as rocket motors).

In certain embodiments, blocked isocyanate compounds may be used to modify the reaction rate of the isocyanate cure reaction (reaction 8). Some or all of the isocyanate compound combined into a reaction mixture may be a blocked isocyanate compound. Such blocked isocyanate compounds may be unreactive below a so-called "unblocking temperature," as determined by the chemical composition of the blocked isocyanate. Blocked isocyanates are known in the art and are known to be used to modify rates of isocyanate cure reactions. Blocked isocyanates may have unblocking temperatures from, for example, about 110° C. to about 180° C. If the temperature of the reaction mixture is below the unblocking temperature, the blocked isocyanate will not react. Thus, a reaction mixture wherein all the isocyanate is a blocked isocyanate may be stable (i.e., the reaction may not cure) at a storage temperature (e.g., 20° C.). Such a reaction mixture may require a heat source (e.g., a heated substrate upon which it is applied, a heated application nozzle, etc.) before the reaction proceeds.

In some embodiments, one or more polyols may be added to the reaction mixture, for example, to produce a foam having a different toughness or flexibility. Reactions of the polysilazane with polyols may limit or avoid the problem of polymer scission because each polyol has two or more alcohol functional groups, each of which may react with a portion of a polysilazane. A difunctional alcohol theoretically has no net effect on the cross-link density of cured insulating materials because the scission caused by one of the alcohol groups is counteracted by the other alcohol group's linking with another polysilazane chain. Polyols with three or more alcohol functional groups may increase the cross-link density. A foam formed from a polyol may exhibit higher toughness and flexibility than a similar foam formed from a reaction mixture with a monofunctional alcohol. The length between cross-links may be varied by varying the molecular weight of polyol reactants. A longer length between cross-links may correspond to a more flexible cured foam. Without being bound by a particular theory, it is believed that an increased length between cross-links increases toughness by providing microphase separations that may stunt the propagation of cracks. The length between cross-links may be varied by varying the concentrations and types of polyols in the reaction mixture, and by varying the average molecular weight of the polyols.

Polyols may be used to control the rate of the isocyanate cure reaction. Alcohols in the reaction mixture may react with isocyanates (as in reaction 2) and/or with polysilazanes (as in reaction 6). Because alcohol reactions compete with the isocyanate cure reaction (reaction 8), the cure rate of the reaction mixture may be modified by the presence of alcohols. Polyols may be particularly advantageous for such cure rate modifications because they need not lower the cross-link density of the final product.

In certain embodiments, a solid filler may be added to the reaction mixture. Upon curing, a foam containing such a solid filler may exhibit enhanced ablative performance or other properties than a foam without solid fillers. Solid fillers may include, for example, fumed silica, glass microspheres, boron carbide, zinc borate, expanding graphite, aluminum trihydrate, etc. The microspheres may be formed of glass, silica, ceramic, polymeric, phenolic, or combinations thereof By way of example, the expanding graphite may be GRAF-GUARD® expandable graphite flake, available from GrafTech International, of Parma, Ohio. Boron carbide used as a solid filler may include, for example, a −325 mesh boron carbide (i.e., boron carbide that passes through a No. 325 mesh sieve, particles with a maximum diameter of about 44 µm), currently available from Electro Abrasives, of Buffalo, N.Y.

To aid in processing, one or more surfactants may be added to the reaction mixture. For example, if water is used as a gas-generating compound in the reaction mixture, a surfactant may improve the solubility of the water with the other components of the reaction mixture. The surfactant may affect the formation, stability, and morphology of gas bubbles in the reaction mixture. As the reaction mixture cures, the gas bubbles form cells of the cured foam. The cell size may affect properties of the foam, such as thermal resistivity, density, etc. The size of gas bubbles in the reaction mixture may be varied by varying the concentration and identity of surfactants in the reaction mixture. Because the size of gas bubbles in the reaction mixture may determine the properties of cured foams, different surfactants or concentrations thereof may be used to produce foams with different properties. As one example, a silicone glycol copolymer surfactant may be added to the precursor formulation, such as DABCO® DC5598, available from Air Products and Chemicals, Inc., of Allentown, Pa.

In some embodiments, cells within foams may be formed by adding small amounts of volatile materials, called blowing agents, to the reaction mixture before or as it reacts. Blowing agents may be solvents such as chlorocarbons, fluorocarbons, hydrofluorocarbons (HFCs) (e.g., HFC-134a or HFC-245fa), chlorofluorocarbons (CFCs), hydrochlorofluorocarbons (HCFCs), or other hydrocarbons (e.g., pentanes or butanes). Blowing agents may be inert (i.e., they may not substantially react with the reaction mixture). Hydrocarbons with low boiling points, such as butane, pentane, and isopentane, may be used as blowing agents because they form gases at temperatures useful for forming insulation materials. The blowing agent may be mixed with the reactants (e.g., the polysilazane or isocyanate) under pressure or at low temperature. When the pressure on the blowing agent is reduced (e.g., in a mixing nozzle), the blowing agent may boil, forming bubbles in the mixture. The bubbles may become encapsulated as the reaction mixture cures, forming cells of the foam. Blowing agents may produce a foam with desirable physical properties, such as a selected density, strength, and/or thermal resistivity. Properties may vary based on the concentration and identity of the blowing agents, as well as on other conditions (e.g., temperature, pressure, concentration of other reactants, etc.). In some embodiments, the gas-generating compound (such as water, an alcohol, or an amine) may be used as a blowing agent insomuch as it generates gas in the precursor formulation. These gas-generating compounds may be used instead of or in addition to an inert blowing agent. These gas-generating compounds may have fewer or less-serious environmental concerns than solvent blowing agents. Since the gas-generating compounds may be liquid or solid at room temperature, and may be non-hazardous, storage and handling may be simplified in comparison with the storage and handling of other blowing agents.

In some embodiments, the reaction mixture may be formed by mixing three components simultaneously. That is, the isocyanate, the polysilazane, and the gas-generating compound may be kept separate until the point of application. These three ingredients may be kept separate before use because any two of the components may react together (i.e., the isocyanate may react with the polysilazane, and either may react with the gas-generating compound). In other embodiments, two of these three components may be premixed prior to the point of use. For example, an isocyanate may be premixed with polysilazane before use. This premix may then be combined with the gas-generating compound in a two-part mixing nozzle. So long as the premix of isocyanate and polysilazane has a finite reaction rate at a storage temperature, the mixture has a limited pot life (i.e., time before the premix cures). For example, a premix of IPDI and polysilazane may have a pot life of one to three hours. Premixes of other, more reactive isocyanates may have shorter pot lives— much shorter in some instances. If the pot life of a premix is too short, there may be insufficient time to mix the other components before the premix cures. Catalysts may be added to the premix or the other components (e.g., the gas-generating component) to change the reaction rate, such as to increase the reaction rate of the isocyanate cure reaction in the final reaction mixture.

After combining the components, the precursor formulation may be applied and cured, forming the insulating material. The precursor formulation may be applied to an article, such as by spraying, pouring, or injecting, and foamed in situ. The precursor formulation may conform to an outer surface of the article and then be cured in situ. Alternatively, the precursor formulation may be foamed and cured in situ, or foamed, cured or partially cured, and secondarily bonded to the article. The precursor formulation may be foamed (i.e., molded) by pouring the precursor formulation into a mold and then curing. The precursor formulation may be cured by heating the precursor formulation, for example, to a temperature of from about 15° C. to about 80° C. By way of example, the precursor formulation may be cured at ambient temperature or another appropriate temperature.

The insulating material on the article may provide thermal protection to the article, such as protecting the article from extreme conditions, such as the conditions present during reentry of the article into Earth's atmosphere or during a fire. Therefore, the insulating material may be used as thermal protection or insulation for articles exposed to extreme conditions, such as for insulation of articles that will be subjected to atmospheric reentry. The insulating material may be used to provide thermal shielding in aerospace or fire protection applications, such as firewalls, firebreaks, insulation of building structural materials (e.g., steel frameworks or substructures). By way of example, the insulating material may be resistant to a temperature of up to about 1500° F. (about 815.6° C.). At these temperatures, the insulating material may maintain its structural integrity and have a low mass loss. The insulating material may have a low density, such as from about 0.05 g/cm$^3$ to about 0.5 g/cm$^3$ (about 3.1 lb/ft$^3$ to about 31.2 lb/ft$^3$). The insulating material may also withstand up to about 325 kcal/m$^2$s (120 BTU/ft$^2$s, or 120 BFS) for up to about 2 minutes and a temperature of up to about 815.6° C. (about 1500° F.) without raising the temperature of a substrate material of the article above about 148.9° C. (about 300° F.).

In certain embodiments, the precursor formulation may include from about 1 weight percent (wt %) polysilazane to about 50 wt % polysilazane. For example, the precursor formulation may include from about 10 wt % to about 44 wt % polysilazane. In particular, the precursor formulation may include about 20 wt % polysilazane.

In certain embodiments, the precursor formulation may include from about 0 wt % to about 80 wt % isocyanate. For example, the precursor formulation may include from about 10 wt % to about 50 wt % isocyanate. In particular, the precursor formulation may include about 30 wt % isocyanate. The isocyanate in the precursor formulation may include an aromatic isocyanate, aliphatic (including cycloaliphatic) isocyanate, or both. For example, the precursor formulation may include from about 0 wt % to about 80 wt % of the aromatic isocyanate (such as MONDUR® CD or MONDUR® 489, available from Bayer MaterialScience LLC, Pittsburgh, Pa., or SUPRASEC® 9150, available from Huntsman Chemical, Auburn Hills, Mich., etc.), such as about 30 wt % of the aromatic isocyanate. The precursor formulation may include from about 0 wt % to about 80 wt % aliphatic isocyanates (such as HDI, IPDI, etc.), such as about 10 wt % aliphatic isocyanates. The precursor formulation may include a ratio of nitrogen equivalents (—NH—) in silazane to isocyanate equivalents (—N=C=O) in isocyanate from about 0.8 to about 1.25. For example, the precursor formulation may include about 67 wt % MDI (equivalent weight of about 125 g/eq) and about 33 wt % polysilazane (approximate equivalent weight of about 70 g/eq) for an approximate equivalence ratio of 0.88. The equivalence ratio may be varied, and may determine the crosslink density and the resulting mechanical properties of the foam. In general, a foam with a higher silazane-to-isocyanate ratio will have a lower modulus.

In some embodiments, the precursor formulation may include from about 0 wt % to about 50 wt % gas-generating compound. For example, the precursor formulation may include from about 1 wt % to about 20 wt % gas-generating compound. In particular, the precursor formulation may include about 16 wt % gas-generating compound. The gas-generating compound may include water, an alcohol, an amine, or combinations thereof. If water is used as the gas-generating compound, the precursor formulation may include from about 1.0 wt % to about 5.0 wt % water, such as from about 1.0 wt % to about 3.0 wt % water. For example, the precursor formulation may include from about 0.5 wt % to about 2.0 wt % water. A higher amount of water in the precursor formulation may generate more gas, which results in an insulating material formed from the precursor formulation having a lower density. In one embodiment, the precursor formulation includes about 1.0 wt % water. The precursor formulation may include from about 0 wt % to about 50 wt % alcohol, such as from about 5.0 wt % to about 40 wt % alcohol. For example, the precursor formulation may include from about 5.0 wt % to about 20 wt % alcohol. In one embodiment, the precursor formulation includes about 15 wt % alcohol. The precursor formulation may include from about 0 wt % to about 50 wt % amine. For example, the precursor formulation may include from about 5.0 wt % to about 20 wt % amine. In one embodiment, the precursor formulation includes about 10 wt % amine.

The precursor formulation may include, for example, less than or equal to about 5.0 wt % surfactant. As a further example, the precursor formulation may include less than or equal to about 3.0 wt % surfactant. The precursor formulation may also include, for example, less than or equal to about 2.0 wt % catalyst. As a further example, the precursor formulation may include up to about 0.05 wt % of catalyst. The precursor formulation may include, in some embodiments, less than or equal to about 30 wt % solvent blowing agent.

In some embodiments, the precursor formulation may include from about 0 wt % to about 50 wt % filler. For example, the precursor formulation may include from about 10 wt % to about 30 wt % filler. In one embodiment, the precursor formulation includes about 20 wt % filler. Examples of foam insulation precursor formulations are shown in Tables 1 through 3.

TABLE 1

| Component | Amount (wt %) |
|---|---|
| CERASET ® Polysilazane 20 (Kion) | 20 |
| Isocyanate (mixture of aliphatic (10%) and aromatic (30%) isocyanates) | 40 |
| Water | 1.0 |

TABLE 1-continued

| Component | Amount (wt %) |
|---|---|
| CAPA ® 3050 polyol (Perstorp Polyols, Toledo, OH) (2-oxepanone polymer with 2-ethyl-2-(hydroxymethyl)-1,3-propanediol) | 15 |
| POLYCAT ® 41 catalyst (Air Products and Chemicals, Inc., Allentown, PA) | 0.05 |
| DABCO ® DC5357 surfactant (Air Products and Chemicals, Inc.) | 3.0 |
| Fillers | 20.95 |

TABLE 2

| Component | Amount (wt %) |
|---|---|
| CERASET ® Polysilazane 20 (Kion) | 38.2 |
| Isocyanates: | |
| TRIXENE ® BI7641 (dimethyl pyrazole, a blocked isocyanate) (Tri-Iso, Inc., Claremont, CA) | 13.5 |
| MONDUR ® CD (a modified MDI) (Bayer MaterialScience LLC, Pittsburgh, PA) | 19.1 |
| Water | 3.4 |
| KRASOL ® LBD2000 polyol (SpecialChem, Paris, France) (polybutadiene with terminal isocyanate groups) | 22.5 |
| DABCO ® DC5598 surfactant (Air Products and Chemicals, Inc., Allentown, PA) | 3.4 |

TABLE 3

| Component | Amount (wt %) |
|---|---|
| CERASET ® Polysilazane 20 (Kion) | 18 |
| Isocyanates | 36 |
| Water | 1.5 |
| CAPA ® 3050 polyol (Perstorp Polyols, Toledo, OH) | 26 |
| DABCO ® DC5337 surfactant (Air Products and Chemicals, Inc., Allentown, PA) | 3.0 |
| POLYCAT ® 41 catalyst (Air Products and Chemicals, Inc., Allentown, PA) | 0.5 |
| Fillers: Silica, 6-12 wt % Boron Carbide, 0-9 wt % Graphite, 0-3 wt% | 15 |

In the formulation shown in Table 2, approximately 41 wt % of the isocyanate is in the form of a blocked isocyanate (dimethyl pyrazole). In other words, the blocked isocyanate accounts for about 41 wt % of the total isocyanate. In other embodiments, the isocyanate may include, for example, from about 10 wt % blocked isocyanate to about 50 wt % blocked isocyanate.

In certain embodiments of the disclosure, an insulating material may be formed by combining a polysilazane, an epoxy resin, and a gas-generating compound, to form the precursor formulation. That is, the cross-linking compound may be an epoxy resin. The gas-generating compound may be an amine, such as a polyamine monomer, which may conventionally be used as a curative for epoxy resins.

The epoxy resin may react with the polysilazane in a similar manner to diisocyanates (reaction 8, above). That is, an epoxide functional group of the epoxy resin may react with one polysilazane molecule, and another epoxide functional group may react with another polysilazane molecule according to the following possible reactions:

(reaction 9)

The epoxy resin may also react with an amine:

(reaction 10)

For simplicity of illustration, only one of the epoxide functional groups of the epoxy resin is shown to react in each of reactions 9 and 10. However, both epoxide groups may react with the polysilazane and/or the amine; if both epoxide groups react, molecules of the polysilazane may become cross-linked. Upon combining the polysilazane, the epoxy resin, and the amine, multiple reactions may proceed simultaneously, for example, as in reactions 3, 9, and 10.

In some embodiments, the reaction rate of a gas-generating reaction (e.g., reaction 3) may be sufficiently high that the gas generated in the reaction mixture may foam the precursor formulation, forming bubbles that remain in the precursor formulation as it cures. Other gas-generating compounds (water, an alcohol, or combinations thereof) may be added to promote the formation of gas bubbles (see reactions 1 and 2). The gas bubbles may become entrained as the precursor formulation cures, forming foam cells in the insulating material.

To modify the rate of one or more reactions and/or to optimize properties of the insulating material, one or more catalysts may be added to the reaction mixture. For example, catalysts such as tertiary or quaternary amines, $BF_3$-amine complexes, or $BCl_3$-amine complexes, may increase the cure rate of the reaction mixture. The specific catalyst to be used may be selected for its ability to promote various reactions.

In certain embodiments, the polysilazane may be premixed with either the epoxy resin or the gas-generating compound, such that the precursor formulation may be formed by combining just two components at the point of use (wherein the two components may be two premixes or a premix and a single reactant). That is, a polysilazane-epoxy resin premix may be combined with a gas-generating compound, or a polysilazane-gas-generating compound premix may be combined with an epoxy resin. Flow rates and mixing may be easier to control for mixtures of two components than for mixing of three or more components. Sufficient mixing may be easier to achieve in a premix than in a mixture of all the reactants of the precursor formulation, because omitting one or more reactants may eliminate or mitigate time, temperature, or other constraints on operations that may be performed. In other words, the reactant to be added later (after the premix is sufficiently mixed) may provide a key ingredient that drives one or more reactions. Without such an ingredient, the premix may react slowly or not at all.

By forming a premix including the polysilazane, the polysilazane may react at least partially with another component of the premix. For example, in a premix of polysilazane and the epoxy resin, an epoxy-modified polysilazane may form (see reaction 9). The epoxy resin may not be fully reacted with the polysilazane, and residual epoxide groups may be available for further reaction. Upon combining the polysilazane-epoxy resin premix with a gas-generating compound, unreacted epoxide groups may react with the gas-generating compound, cross-linking the epoxy-modified polysilazane and curing the reaction mixture.

In a premix of polysilazane and a gas-generating compound, wherein the gas-generating compound is an amine, an amine-modified polysilazane may form. The amine may fully react with the polysilazane (see reaction 3), yet may retain some reactivity toward the epoxy resin.

A premix containing polysilazane may be shelf-stable such that the premix may be prepared in advance (such as in large batches) and may be stored until needed. The premix may contain other reactants, such as at least one polyol, at least one catalyst, at least one solid filler, at least one surfactant, etc., or combination thereof. In some embodiments, two premixes may be prepared, each containing two or more reactants. For example, the polysilazane and epoxy resin may be in one premix, and the gas-generating compound and a catalyst may be in another premix. Another gas-generating compound may be added to the gas-generating compound, such that upon mixing of the components, the polysilazane reacts with both gas-generating compounds, forming gas bubbles. These gas bubbles may become entrained in the precursor formulation and form cells of the resulting cross-linked polymer. The cells may provide enhancement of properties of the resulting insulating material, such as enhanced structural, thermal, density, etc., properties.

The following examples serve to explain embodiments of the precursor formulation of the insulating materials and methods of forming the insulating materials in more detail. These examples are not to be construed as being exhaustive or exclusive as to the scope of the invention.

EXAMPLES

The materials were purchased from commercial sources, such as Kion Specialty Polymers (of Charlotte, N.C.) or Kion Defense Technologies, Inc. (Huntingdon Valley, Pa.) (collectively "Kion"), Bayer MaterialScience LLC (Pittsburgh, Pa.), Air Products and Chemicals, Inc. (Allentown, Pa.), 3M (St. Paul, Minn.), Huntsman Chemical (Auburn Hills, Mich.), Electro Abrasives (Buffalo, N.Y.), Evonik Industries AG (Essen, Germany), Perstop Polyols, Inc. (Toledo, Ohio), GrafTech International (Parma, Ohio), and Trelleborg Offshore Boston, Inc. (Mansfield, Mass.). Unless otherwise specified, percentages in the following examples are weight percentages.

Example 1

25.4% Polysilazane with 4.8% Boron Carbide

Precursor formulation 1 was formed having 25.4% CERASET® Polysilazane 20 (available from Kion), 49.9% MDI (MONDUR® CD, available from Bayer), 1.2% water, 15.1% alcohol (poly(oxy(methyl-1,2-ethanediyl)), α-hydro-Ω-hydroxy, ether (also known as (α-hydro-Ω-hydroxy poly (oxy(methyl-1,2-ethanediyl)) ether) with 2,2-bis(hydroxymethyl)-1,3-propanediol (4:1)) (hereinafter REN® 6405, available from Huntsman Chemical), 0.9% catalyst (0.5% POLYCAT® 41 and 0.4% DABCO® TMR, both available from Air Products), 2.7% DABCO® DC5598 surfactant (available from Air Products), and 4.8% boron carbide (−325 mesh, available from Electro Abrasives). Precursor formulation 1 was formed by hand mixing in a mix cup using a premix of MDI and boron carbide; a premix of alcohol, catalysts, surfactants and water; and polysilazane.

Figure 1:
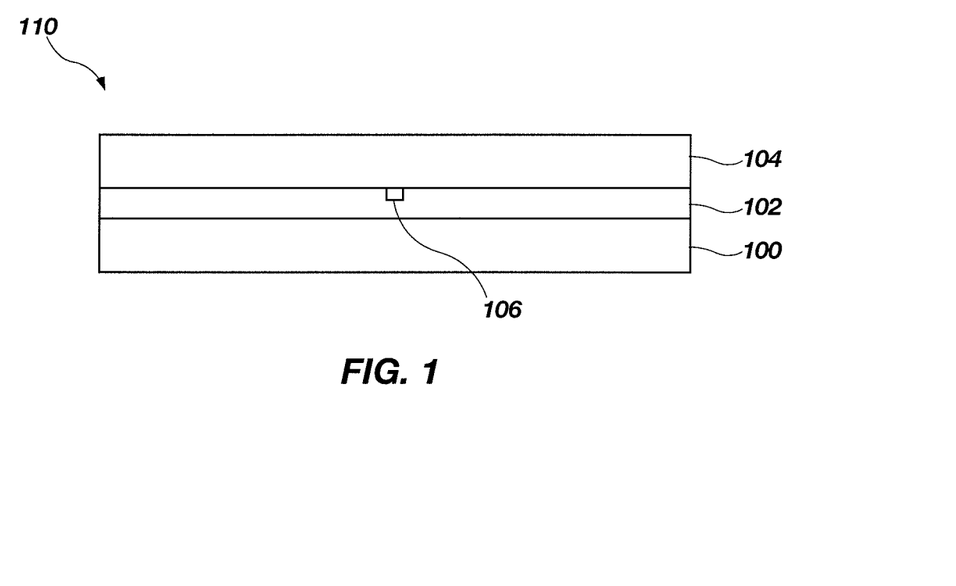
FIGS. 1 and 2 are diagrams showing insulating materials formed according to embodiments of the present disclosure.
Figure 2:
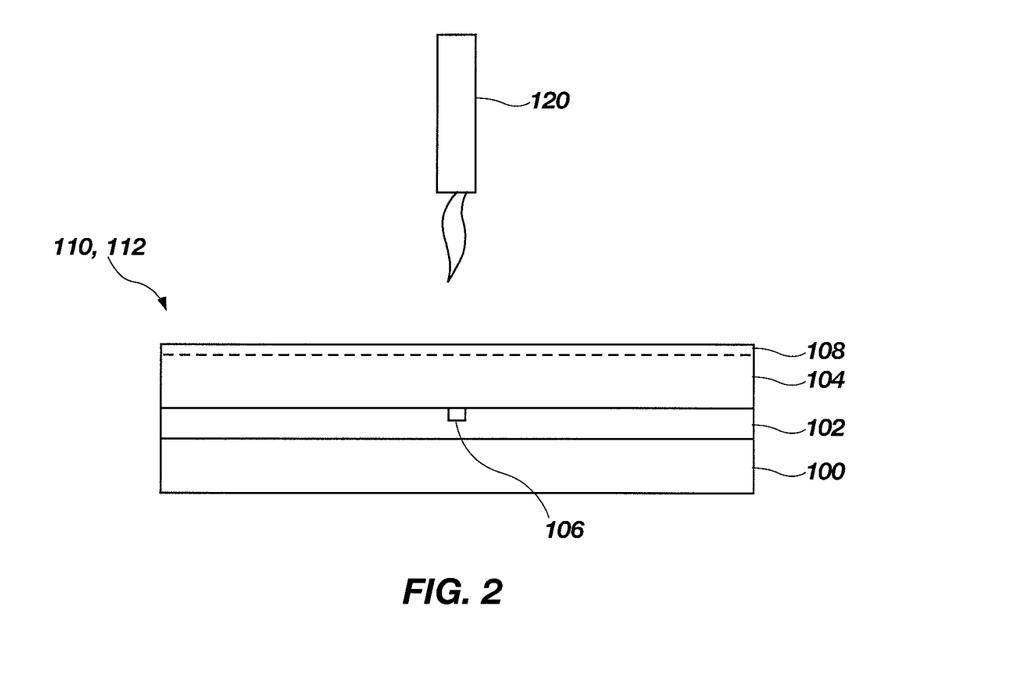

A thermocouple 106 was placed on a 6.35 mm (0.25 in) layer of cork 102 over a backing plate 100, as shown in FIG. 1. Precursor formulation 1 was poured into a mold to a thickness of 25.4 mm (1.0 in) onto the layer of cork 102 and over thermocouple 106. The components of Precursor formulation 1 reacted to form a foam 104. The foam 104 was cured for a minimum of 30 minutes prior to demolding forming test sample 110. The foam 104 had a density of about 0.15 g/cm$^3$ to about 0.20 g/cm$^3$ (9.3 lb/ft$^3$ to 12.5 lb/ft$^3$). The test sample 110 was subjected to a 40 BSF torch test, as shown in FIG. 2.

In the 40 BSF torch test, an oxyacetylene torch 120 was disposed 15.24 cm (6.0 in) from the test sample 110. The oxyacetylene torch 120 was calibrated to provide a heat load of 108.5 kcal/m$^2$s (40 BTU/ft$^2$s, or 40 BFS) to the test sample 110. The test sample 110 was subjected to the heat of the oxyacetylene torch 120 for approximately 60 seconds. The temperature at the thermocouple 106 (the backside temperature) was measured and recorded, with the results shown in FIG. 3. The backside temperature remained approximately constant for 30 seconds, at which time the backside temperature increased rapidly. As a comparison, the backside temperature under a sample of FROTH-PAK™ polyurethane foam (Dow Chemical Co., Midland, Mich.) with similar dimensions remained approximately constant for about 25 seconds (see FIG. 3). The sample of FROTH-PAK™ polyurethane foam disintegrated quickly in the 40 BSF torch test.

Example 2

24.4% Polysilazane with 4.9% Boron Carbide and 2.4% Glass Microspheres

Precursor formulation 2 was formed having 24.4% CERASET® Polysilazane 20 (Kion), 29.3% MDI (MONDUR® CD, Bayer), 19.5% IPDI (Evonik), 1.0% water, 15.5% alcohol (11.7% REN® 6405, Huntsman Chemical, and 3.8% propylene glycol), 0.1% catalyst (0.05% POLYCAT® 41 and 0.05% DABCO® TMR, Air Products), 2.9% DABCO® DC5987 surfactant (Air Products), 4.9% boron carbide (−325 mesh, Electro Abrasives), and 2.4% glass microspheres (3M™ Glass Bubbles K20). Precursor formulation 2 was formed by hand mixing in a mix cup using a premix of isocyanates, boron carbide, and glass microspheres; a premix of alcohol, catalysts, surfactant and water; and polysilazane.

A thermocouple 106 was placed on a 6.35 mm (0.25 in) layer of cork 102 over a backing plate 100, as shown in FIG. 1. Precursor formulation 2 was poured into a mold to a thickness of 25.4 mm (1.0 in) onto the layer of cork 102 and over thermocouple 106. The components of Precursor formulation 2 reacted to form a foam 104. The foam 104 was cured for a minimum of 30 minutes prior to demolding, forming test sample 110. The foam 104 had a density of about 0.15 g/cm$^3$ to about 0.20 g/cm$^3$ (9.3 lb/ft$^3$ to 12.5 lb/ft$^3$). The test sample 110 was subjected to a 40 BSF torch test, as shown in FIG. 2 and described above in Example 1.

Figure 3:
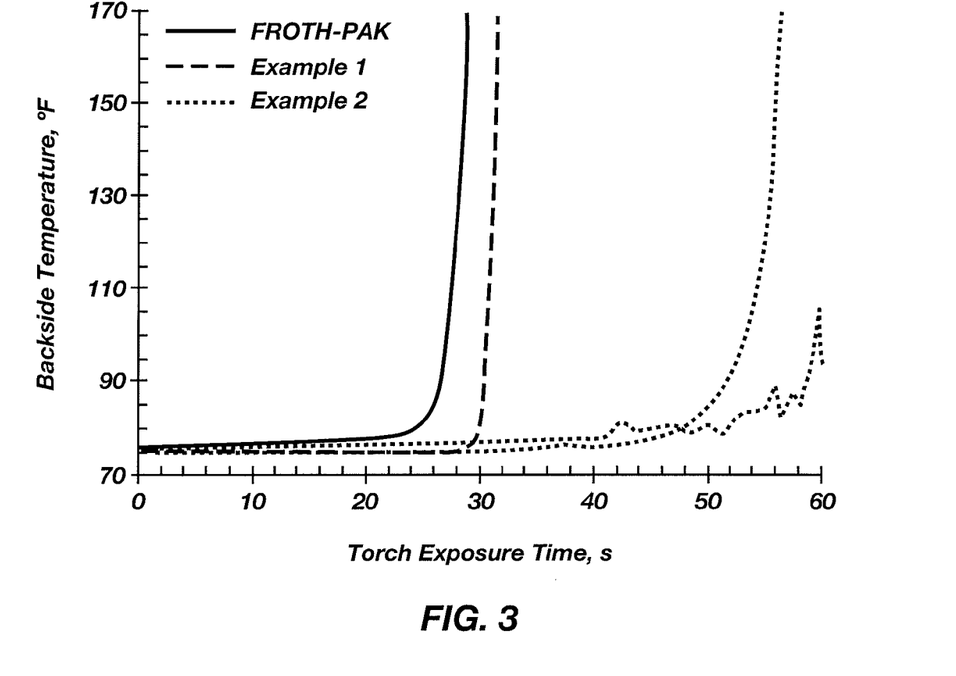
FIG. 3 is a graph showing test data from flame tests of samples of insulating materials formed according to embodiments of the present disclosure.

The test was performed in duplicate. The temperature at the thermocouple 106 (the backside temperature) was measured and recorded, and the results are shown in FIG. 3. The backside temperature of each test sample 110 remained approximately constant for 50 seconds, at which time the backside temperatures increased. The backside temperatures of the foam of the test sample in Example 2 increased slower than the backside temperatures of the foam of the test sample 110 of Example 1 and the FROTH-PAK™ polyurethane foam sample (see FIG. 3).

Example 3

23.7% Polysilazane with 9.1% Boron Carbide with Graphite Coating

Precursor formulation 3 was formed having 23.7% CERASET® Polysilazane 20 (Kion), 47.6% MDI (MONDUR® CD, Bayer), 0.8% water, 14.8% alcohol (7.4% REN® 6405, Huntsman Chemical, and 7.4% dipropylene glycol), 1.0% catalyst (0.5% POLYCAT® 41 and 0.5% DABCO® TMR, Air Products), 3.0% DABCO® DC5598 surfactant (Air Products), and 9.1% boron carbide (−325 mesh, Electro Abrasives). Precursor formulation 3 was formed by hand mixing in a mix cup using a premix of catalysts, surfactant, boron carbide alcohol and water; MDI; and polysilazane.

Figure 4:
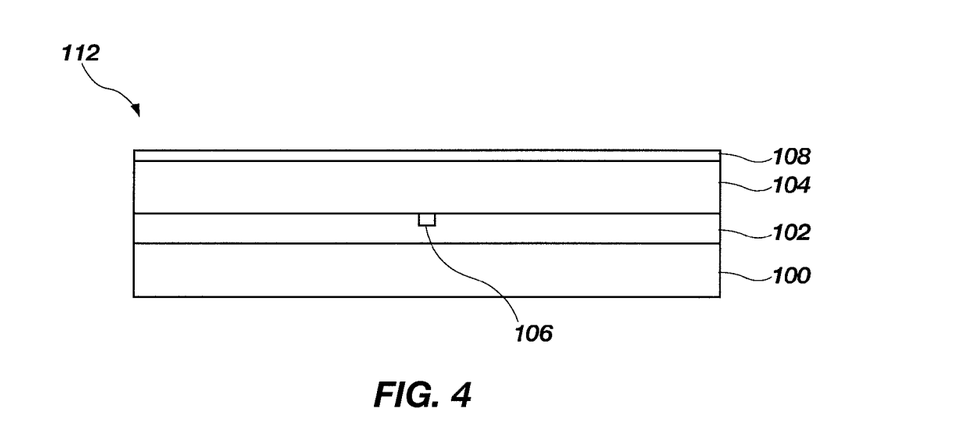
FIG. 4 is a diagram showing an insulating material formed according to embodiments of the present disclosure.

A thermocouple 106 was placed on a 6.35 mm (0.25 in) layer of cork 102 over a backing plate 100, as shown in FIG. 4. Precursor formulation 3 was poured into a mold to a thickness of 25.4 mm (1.0 in) onto the layer of cork 102 and over thermocouple 106. The components of precursor formulation 3 reacted to form a foam 104. The foam 104 was cured for a minimum of 30 minutes prior to demolding. The foam 104 had a density of about 0.15 g/cm$^3$ to about 0.20 g/cm$^3$ (9.3 lb/ft$^3$ to 12.5 lb/ft$^3$). A coating 108 of expanding graphite and glass in a polysilazane matrix was applied to the foam 104 to form a test sample 112 (FIG. 2). The coating was 12.5% expanding graphite (GRAFGUARD® 220-80, GrafTech International), 12.5% glass microspheres (3M™ Glass Bubbles K20), 37.5% polysilazane (CERASET® 20 Kion), and 37.5% IPDI (VESTANAT® IPDI, Evonik). The coating was mixed and applied by hand to the surface of the foam to a thickness of about 0.5 mm to about 1.0 mm (0.020 in to 0.060 in). The coating was allowed to cure at room temperature (approximately 22° C.) for a minimum of 18 hours prior to handling. The test sample 112 was subjected to a 40 BSF torch test, as shown in FIG. 2 and described above in Example 1.

Figure 5:
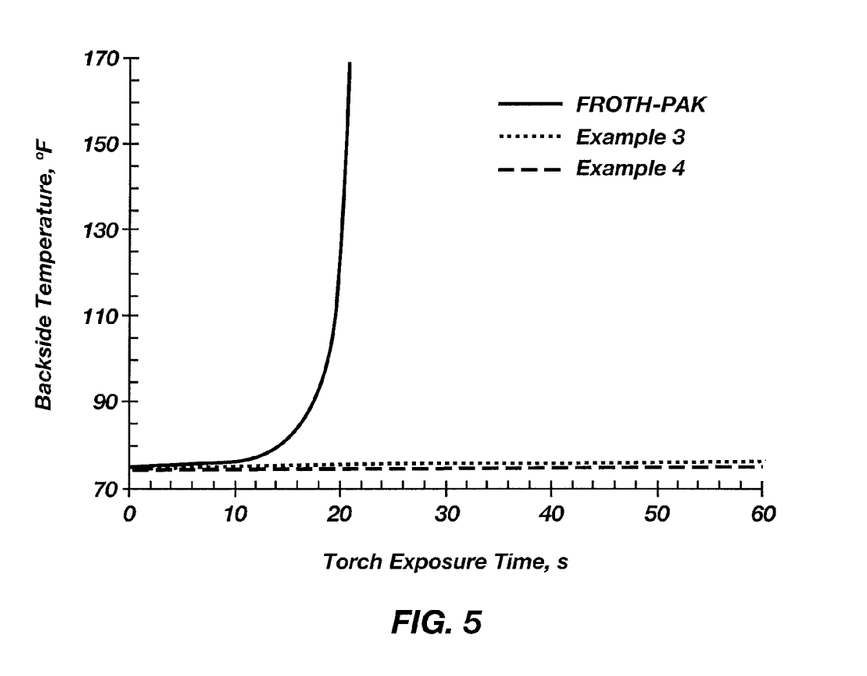
FIGS. 5 through 7 are graphs showing test data from flame tests of samples of insulating materials formed according to embodiments of the present disclosure.

The temperature at the thermocouple 106 (the backside temperature) was measured and recorded, and the results are shown in FIG. 5. The backside temperature of the test sample 112 remained approximately constant for 60 seconds—the length of the test. As a comparison, the backside temperature under a sample of FROTH-PAK™ polyurethane foam (Dow Chemical Co., Midland, Mich.), treated with the same coating 108, remained approximately constant for 15 seconds (see FIG. 5).

Example 4

22.7% Polysilazane with 8.7% Boron Carbide and 4.4% Glass Microspheres with Graphite Coating Precursor formulation 4 was formed having 22.7% CERASET® Polysilazane 20 (Kion), 45.4% MDI (MONDUR® CD, Bayer), 0.7% water, 14.2% alcohol (7.1% REN® 6405, Huntsman Chemical, and 7.1% dipropylene glycol), 1.0% catalyst (0.5% POLYCAT® 41 and 0.5% DABCO® TMR, Air Products), 2.9% DABCO® DC5598 surfactant (Air Products), 8.7% boron carbide (−325 mesh, Electro Abrasives), and 4.4% glass microspheres (3M™ Glass Bubbles K20). Precursor formulation 4 was formed by hand mixing in a mix cup using a premix of alcohol, water, catalysts, surfactant, boron carbide, and glass microspheres; MDI; and polysilazane.

A thermocouple 106 was placed on a 6.35 mm (0.25 in) layer of cork 102 over a backing plate 100, as shown in FIG. 4. Reaction mixture 4 was poured into a mold to a thickness of 25.4 mm (1.0 in) onto the layer of cork 102 and over thermocouple 106. The components of precursor formulation 4 reacted to form a foam 104. After the foam 104 cured for a minimum of 30 minutes, a coating 108 of expanding graphite and glass in a polysilazane matrix was applied to the foam 104, forming test sample 112. The coating was 12.5% expanding graphite (GRAFGUARD® 220-80, GrafTech International), 12.5% glass microspheres (3M™ Glass Bubbles K20), 37.5% polysilazane (CERASET® 20, Kion), and 37.5% IPDI (VESTANAT® IPDI, Evonik). The coating was mixed and applied by hand to the surface of the foam to a thickness of about 0.5 mm to about 1.0 mm (0.020 in to 0.060 in). The coating was allowed to cure at room temperature (approximately 22° C.) for a minimum of 18 hours prior to handling. The foam 104 had a density of about 0.15 g/cm³ to about 0.20 g/cm³ (9.3 lb/ft³ to 12.5 lb/ft³). The test sample 112 was subjected to a 40 BSF torch test, as shown in FIG. 2 and described above in Example 1.

The temperature at the thermocouple 106 (the backside temperature) was measured and recorded, and the results are shown in FIG. 5. The backside temperature of the sample remained approximately constant for 60 seconds—the length of the test—similar to the results observed with the test sample 112 of Example 3.

Example 5

23.7% Polysilazane with 9.1% Boron Carbide with Graphite Coating

Figure 6:
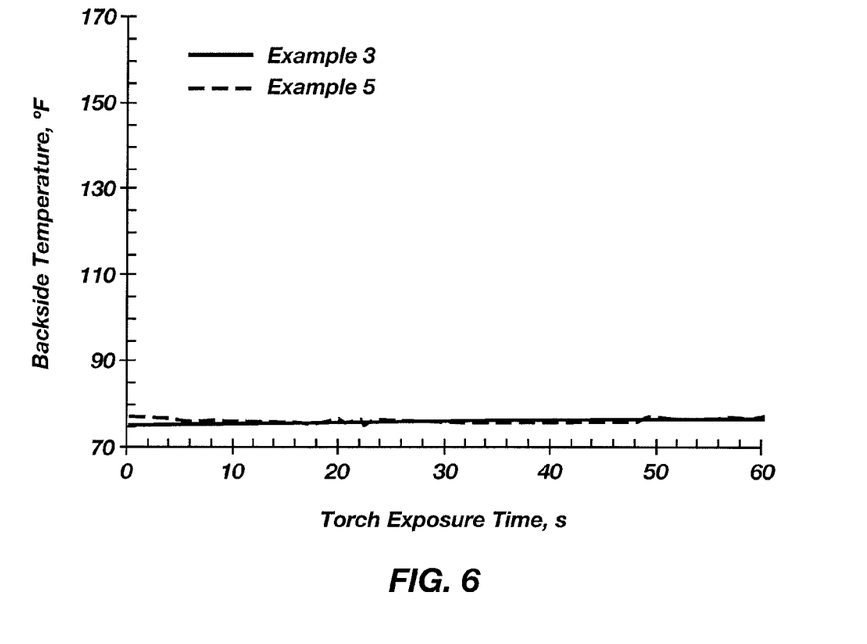

After it passed the 40 BSF torch test, the test sample 112 described in Example 3 above was subjected to an 80 BSF torch test. For the 80 BSF torch text, the oxyacetylene torch 120 (FIG. 2) was calibrated to provide twice the heat load, 217.0 kcal/m²s (80 BTU/ft²s, or 80 BFS) to the test sample 112. The backside temperature of the test sample 112 subjected to the 80 BFS torch test remained approximately constant for 60 seconds—the length of the test (see FIG. 6), similar to the results observed with the test sample 112 of Example 3.

Example 6

Figure 7:
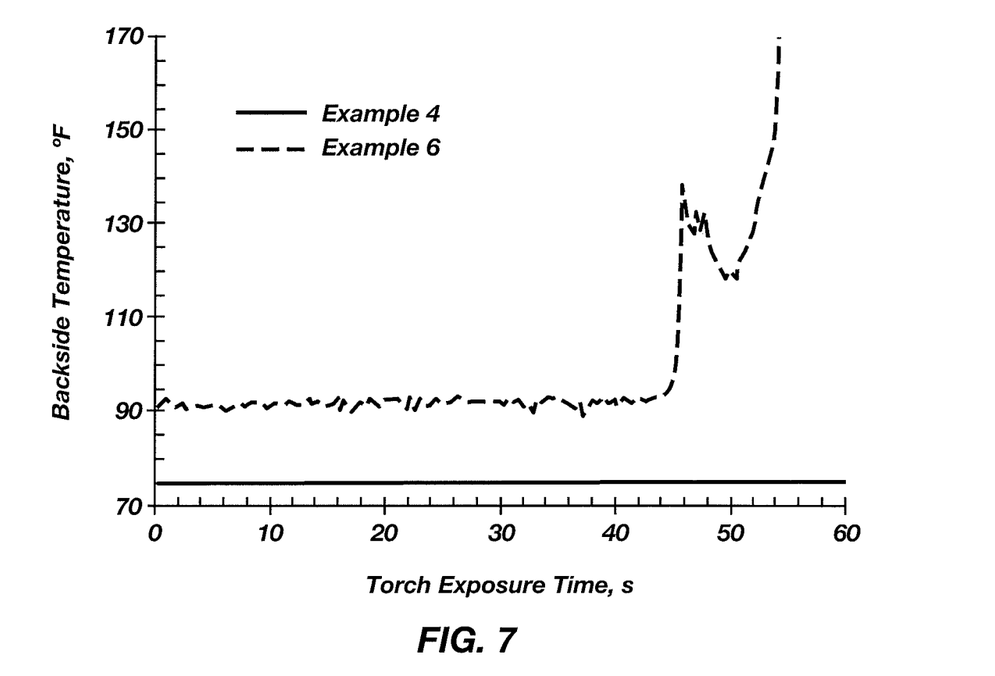

22.7% Polysilazane with 8.7% Boron Carbide and 4.4% Glass Microspheres with Graphite Coating After it passed the 40 BSF torch test, the test sample 112 described in Example 4 above was subjected to an 80 BSF torch test. The backside temperature of the test sample 112 subjected to the 80 BFS torch test remained approximately constant for 45 seconds, then increased rapidly (see FIG. 7). As a comparison, the backside temperature of a similar test sample 112 (Example 4) in the 40 BFS torch test remained approximately constant for the entire length of the test.

Example 7

20% Polysilazane, 15% Glass Microspheres, and 2% Graphite

Precursor formulation 7 was formed having 20.2% HTT 1800 polysilazane (Kion), 17.8% MDI (MONDUR® 489, Bayer), 17.8% IPDI (VESTANAT® IPDI, Evonik), 1.5% water, 25% alcohol (12.4% CAPA® 4101 plus 12.6% CAPA® 3050, Perstorp), 0.3% catalyst (POLYCAT® 41, Air Products), 3.1% DABCO® DC5598 surfactant (Air Products), 12.5% glass microspheres (ECCOSPHERES® SI-250, Trelleborg Offshore Boston, Inc.), and 1.8% graphite (GRAFGUARD® expandable graphite flake 220-80, GrafTech International). Precursor formulation 7 was formed by hand mixing in a mix cup using a premix of MDI and IPDI; a premix of alcohol, water, surfactant, catalyst, glass microspheres; and a premix of polysilazane, graphite and glass microspheres.

Figure 8:
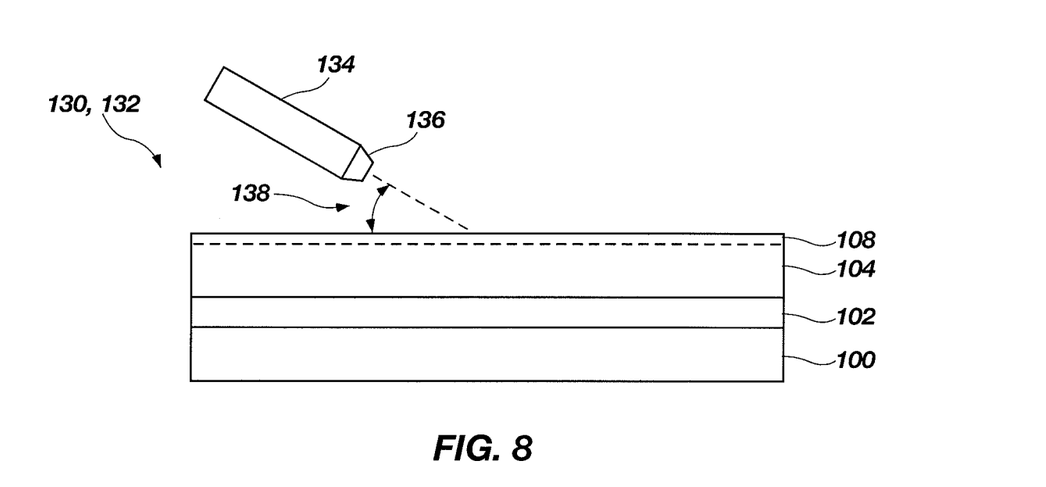
FIG. 8 is diagram showing an experimental test of insulating material formed according to embodiments of the present disclosure.

Precursor formulation 7 was poured into a mold to a thickness of 25.4 mm (1.0 in) onto a backing plate 100, as shown in FIG. 8. The components of Precursor formulation 8 reacted to form a foam 104. The foam 104 was cured for a minimum of 30 minutes prior to demolding, forming test sample 130. The foam 104 had a density from about 0.13 g/cm³ to 0.16 g/cm³ (8 lb/ft³ to 10 lb/ft³). The test sample 130 was subjected to a hot gas test.

In the hot gas test, a nozzle 136 was disposed approximately 183 cm (72 in) from the test sample 130 at an attack angle 138 of 20°. The nozzle 136 was calibrated to deliver hot gas from a hot gas source 134 at a heat load of 75.9 kcal/m²s (28 BTU/ft²s, or 28 BFS) to the test sample 130. The test sample 130 was subjected to the hot gas from the nozzle 136 until the foam 104 was observed to fail. The time of failure was measured and recorded. The test was terminated after 11.0 s upon exposure of the backing plate 100. The foam was observed to form channels, rather than erode evenly across the surface. As a comparison, a sample of FROTH-PAK™ polyurethane foam (Dow Chemical Co., Midland, Mich.) with similar dimensions failed after 5.4 s.

Example 8

20% Polysilazane, 6% Glass Microspheres, and 9% Boron Carbide, with Coating

Precursor formulation 8 was formed having 20% HTT 1800 polysilazane (Kion), 17.7% MDI (MONDUR® 489, Bayer), 17.7% IPDI (VESTANAT® IPDI, Evonik), 1.5% water, 24.8% alcohol (12.3% CAPA® 4101 plus 12.5% CAPA® 3050, Perstorp), 0.3% catalyst (POLYCAT® 41, Air Products), 3.1% DABCO® DC5598 surfactant (Air Products), 9.0% boron carbide (−325 mesh, Electro Abrasives), and 6% glass microspheres (ECCOSPHERES® SI-250, Trelleborg Offshore Boston, Inc.). Precursor formulation 8 was formed by hand mixing in a mix cup using a premix of MDI and IPDI; a premix of alcohol, surfactant, water and; and a premix of polysilazane, glass microspheres and boron carbide.

Precursor formulation 8 was poured into a mold to a thickness of 25.4 mm (1.0 in) onto a backing plate 100, as shown in FIG. 8. The components of Precursor formulation 8 reacted to form a foam 104. The foam 104 was cured for a minimum of 30 minutes prior to demolding. The foam 104 had a density from about 0.16 g/cm$^3$ to 0.19 g/cm$^3$ (10 lb/ft$^3$ to 12 lb/ft$^3$). A coating 108 was formed of 3.7% graphite (GRAFGUARD® expandable graphite flake 220-80, GrafTech International), 7.5% glass microspheres (ECCOSPHERES® SI-250, Trelleborg Offshore Boston, Inc.), 30.0% MDI (SUPRASEC® 9150, Huntsman Chemical) and 58.8% HTT 1800 polysilazane (Kion). The coating was mixed and applied by hand to a thickness of about 0.5 mm to about 2 mm (0.020 in to 0.060 in). The coating was tack free within 15 minutes, forming test sample 132 (FIG. 8). The test sample 132 was subjected to a hot gas test as described in Example 7.

The hot gas test was performed in duplicate, with identical samples. The first hot gas test was terminated after 30.4 s upon exposure of the backing plate 100. The coating 108 and foam 104 eroded generally uniformly across the sample, though some channeling was observed. The second hot gas test was terminated after 20.3 s upon exposure of the backing plate 100. The foam exhibited more channeling than the form 104 in the first hot gas test, and the coating 108 was removed unevenly.

Example 9

20% Polysilazane, 6% Glass Microspheres, and 9% Boron Carbide, with Coating

A test sample 132 was formed as described in Example 8. The test sample 130 was subjected to a hot gas test in which the heat load was 124.8 kcal/m$^2$s (46 BTU/ft$^2$s, or 46 BFS) and the attack angle 138 was 30°. The foam was observed to form channels, rather than erode evenly across the surface. A shock (i.e., a testing anomaly) was observed, leading to turbulent flow and rapid erosion of the backing plate 100. The test was terminated after 10.1 s upon exposure of the backing plate 100.

While the invention is susceptible to various modifications and alternative forms, specific embodiments have been shown by way of example in the drawings and have been described in detail herein. However, the invention is not intended to be limited to the particular forms disclosed. Rather, the invention is to cover all modifications, equivalents, and alternatives falling within the scope of the invention as defined by the following appended claims and their legal equivalents.

What is claimed is:

1. A method of forming an insulating material, comprising:
   combining a polysilazane, a filler, a cross-linking compound, and a gas-generating compound to form a reaction mixture, the gas-generating compound selected from the group consisting of water, an alcohol, an amine, and combinations thereof; the cross-linking compound selected from the group consisting of an isocyanate, an epoxy resin, and combinations thereof; and the filler selected from the group consisting of fumed silica, glass microspheres, boron carbide, zinc borate, and expanding graphite;
   reacting the polysilazane with at least one of the gas-generating compounds and an epoxy resin cross-linking compound to form a gaseous product in the reaction mixture; and
   curing the reaction mixture to form a modified polysilazane comprising a plurality of pores.

2. The method of claim 1, wherein curing the reaction mixture comprises exposing the reaction mixture to a temperature between about 20° C. and about 25° C.

3. The method of claim 1, wherein combining a polysilazane, a cross-linking compound, and a gas-generating compound to form a reaction mixture comprises combining a polysilazane, an aromatic isocyanate, and water.

4. The method of claim 1, wherein combining a polysilazane, a cross-linking compound, and a gas-generating compound to form a reaction mixture comprises combining a polysilazane, methylene diphenyl diisocyanate, dipropylene glycol, and water.

5. The method of claim 1, further comprising coating the modified polysilazane with a filler and a polysilazane matrix, the filler comprising at least one of fumed silica, glass microspheres, boron carbide, zinc borate, and expanding graphite.

6. The method of claim 1, further comprising forming a coating over the modified polysilazane, the coating comprising graphite and glass microspheres.

7. The method of claim 1, wherein combining a polysilazane, a cross-linking compound, and a gas-generating compound to form a reaction mixture comprises combining a polysilazane, a blocked isocyanate, an unblocked isocyanate, water, an alcohol, and a surfactant.

8. An insulating material, comprising:
   a matrix comprising one of a reaction product of a polysilazane and an isocyanate or a reaction product of a polysilazane and an epoxy resin, and further comprising a filler selected from the group consisting of fumed silica, glass microspheres, boron carbide, zinc borate, and expanding graphite;
   wherein the matrix comprises a plurality of pores formed by a gaseous product of one of a reaction of the polysilazane and a gas-generating compound selected from the group consisting of water, an alcohol, an amine, and combinations thereof, or by reaction of the polysilazane and the epoxy resin.

9. The insulating material of claim 8, wherein the insulating material has a density of less than about 0.16 g/cm$^3$.

10. A precursor formulation, comprising:
    a polysilazane;
    a cross-linking compound selected from the group consisting of an isocyanate, an epoxy resin, and combinations thereof;
    a gas-generating compound selected from the group consisting of water, an alcohol, an amine, and combinations thereof; and
    a filler selected from the group consisting of fumed silica, glass microspheres, boron carbide, zinc borate, and expanding graphite.

11. The precursor formulation of claim 10, further comprising a catalyst, wherein the catalyst comprises a metal salt complex, a quaternary ammonium salt, an alkali metal carboxylate, a tertiary amine, or a quaternary amine.

12. The precursor formulation of claim 10, further comprising a surfactant.

13. A precursor formulation, comprising:
- a polysilazane;
- a cross-linking compound comprising a blocked isocyanate; and
- a gas-generating compound selected from the group consisting of water, an alcohol, an amine, and combinations thereof.

14. The precursor formulation of claim 13, wherein the cross-linking compound further comprises an unblocked isocyanate, and wherein the gas-generating compound comprises water and an alcohol.

15. The precursor formulation of claim 13, wherein the precursor formulation comprises a polysilazane, dimethyl pyrazole, methylene diphenyl diisocyanate, water, and polybutadiene with terminal isocyanate groups.

16. The precursor formulation of claim 13, wherein the precursor formulation comprises a polysilazane, methylene diphenyl diisocyanate, water, α-hydro-Ω-hydroxy poly(oxy(methyl-1,2-ethanediyl)) ether, and 2,2-bis(hydroxymethyl)-1,3-propanediol.

* * * * *